United States Patent
Tofsland (10) Patent No.: US 11,020,698 B2
(45) Date of Patent: Jun. 1, 2021

(54) FILTER WITH VARIABLE CROSS-SECTION AXIAL SEAL

(71) Applicant: Cummins Filtration IP, Inc., Columbus, IN (US)

(72) Inventor: Ken Tofsland, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 314 days.

(21) Appl. No.: 15/781,585

(22) PCT Filed: Nov. 21, 2016

(86) PCT No.: PCT/US2016/063053
§ 371 (c)(1),
(2) Date: Jun. 5, 2018

(87) PCT Pub. No.: WO2017/099984
PCT Pub. Date: Jun. 15, 2017

(65) Prior Publication Data
US 2020/0261837 A1    Aug. 20, 2020

Related U.S. Application Data (60) Provisional application No. 62/266,219, filed on Dec. 11, 2015.

(51) Int. Cl.
*B01D 46/00* (2006.01)
*B01D 46/24* (2006.01)
*F02M 35/024* (2006.01)

(52) U.S. Cl.
CPC ...... *B01D 46/0005* (2013.01); *B01D 46/2411* (2013.01); *B01D 2271/022* (2013.01); *B01D 2279/60* (2013.01); *F02M 35/02416* (2013.01)

(58) Field of Classification Search
CPC ............ B01D 46/0005; B01D 46/2411; B01D 2279/60; B01D 2271/022; F02M 35/02416
See application file for complete search history.

(56) References Cited

U.S. PATENT DOCUMENTS 2,093,877 A    9/1937  Von Pentz
2,270,969 A    1/1942  Robinson
(Continued)

FOREIGN PATENT DOCUMENTS

CN    2296402    11/1998
CN    2372041    4/2000
(Continued)

OTHER PUBLICATIONS

First Office Action issued for German Patent Application No. 11 2010 001 567.8, including English language translation, dated May 18, 2017, 6 pages.
(Continued)

*Primary Examiner* — Robert Clemente
(74) *Attorney, Agent, or Firm* — Foley & Lardner LLP (57) ABSTRACT

Filtration systems having filter elements having an axial seal member with a variable cross-section are described. The variable cross-section is matched by the non-planar sealing surfaces of the housing and housing cover that receive the filter elements. The non-planar sealing surfaces of the housing and the housing cover prevent proper filtration system function when an unauthorized replacement filter element having a flat axial seal member is installed in the housing.

20 Claims, 8 Drawing Sheets

(56) References Cited

U.S. PATENT DOCUMENTS

| | | |
|---|---|---|
| 2,306,325 A | 12/1942 | Allam |
| 2,910,332 A | 10/1959 | Madsen |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns |
| 3,383,841 A | 5/1968 | Olson |
| 3,494,113 A | 2/1970 | Kinney |
| 3,576,095 A | 4/1971 | Rivers |
| 3,582,095 A | 6/1971 | Bogaert et al. |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,129,429 A | 12/1978 | Humbert et al. |
| 4,144,169 A | 3/1979 | Grueschow |
| 4,181,313 A * | 1/1980 | Hillier .................... F16J 15/104 277/638 |
| 4,211,543 A | 7/1980 | Tokar et al. |
| 4,300,928 A | 11/1981 | Sugie |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,865,636 A | 9/1989 | Raber |
| 4,915,831 A | 4/1990 | Taylor |
| 4,925,561 A | 5/1990 | Ishii et al. |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,094,745 A | 3/1992 | Reynolds |
| 5,120,334 A | 6/1992 | Cooper |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,258,118 A | 11/1993 | Gouritin et al. |
| 5,298,160 A | 3/1994 | Ayers et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Brown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,709,722 A | 1/1998 | Nagai et al. |
| 5,720,790 A * | 2/1998 | Kometani ............ B01D 39/163 55/497 |
| 5,738,785 A | 4/1998 | Brown et al. |
| 5,753,116 A | 5/1998 | Baumann et al. |
| 5,759,217 A | 6/1998 | Joy |
| 5,772,883 A | 6/1998 | Rothman et al. |
| 5,795,361 A | 8/1998 | Lanier et al. |
| 5,803,024 A | 9/1998 | Brown |
| 5,820,646 A | 10/1998 | Gillingham et al. |
| 5,853,439 A | 12/1998 | Gieseke et al. |
| 5,863,424 A | 1/1999 | Lee |
| 5,891,402 A | 4/1999 | Sassa et al. |
| 5,893,939 A | 4/1999 | Rakocy et al. |
| 5,902,364 A | 5/1999 | Tokar et al. |
| 5,948,248 A | 9/1999 | Brown |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |
| 6,235,195 B1 | 5/2001 | Tokar |
| 6,238,554 B1 | 5/2001 | Martin et al. |
| 6,238,561 B1 | 5/2001 | Liu et al. |
| 6,261,334 B1 | 7/2001 | Morgan et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,018 B2 | 11/2002 | Fedorowicz et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,953,124 B2 | 10/2005 | Winter et al. |

(56) References Cited

U.S. PATENT DOCUMENTS

| | | |
|---|---|---|
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2 | 5/2006 | Katayama et al. |
| 7,076,641 B2 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke et al. |
| 7,217,361 B2 | 5/2007 | Connor et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2 | 12/2007 | Adamek et al. |
| 7,338,544 B2 | 3/2008 | Sporre et al. |
| 7,351,270 B2 | 4/2008 | Engelland et al. |
| 7,396,375 B2 | 7/2008 | Nepsund et al. |
| 7,425,226 B2 | 9/2008 | Powell |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,674,308 B2 | 3/2010 | Krisko et al. |
| 7,682,416 B2 | 3/2010 | Engelland et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,931,723 B2 | 4/2011 | Cuvelier |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,048,187 B2 | 11/2011 | Merritt et al. |
| 8,061,530 B2 | 11/2011 | Kindkeppel et al. |
| 8,062,399 B2 | 11/2011 | Nelson et al. |
| 8,101,003 B2 | 1/2012 | Krisko et al. |
| 8,119,002 B2 | 2/2012 | Schiavon et al. |
| 8,241,383 B2 | 8/2012 | Schrage et al. |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,357,219 B2 | 1/2013 | Boehrs et al. |
| 8,480,779 B2 | 7/2013 | Boehrs et al. |
| 8,496,723 B2 | 7/2013 | Reichter et al. |
| 8,518,141 B2 | 8/2013 | Schrage et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,753,414 B2 | 6/2014 | Gebert |
| 8,778,043 B2 | 7/2014 | Krisko et al. |
| 8,840,699 B2 | 9/2014 | Bruce et al. |
| 8,852,308 B2 | 10/2014 | Jarrier |
| 8,906,128 B2 | 12/2014 | Reichter et al. |
| 8,926,725 B2 | 1/2015 | Loken et al. |
| 9,114,346 B2 | 8/2015 | Schrage et al. |
| 9,320,997 B2 | 4/2016 | Campbell et al. |
| 9,415,333 B2 | 8/2016 | Kindkeppel et al. |
| 9,782,708 B2 | 10/2017 | Kindkeppel et al. |
| 10,729,999 B2 | 8/2020 | Nichols et al. |
| 10,744,443 B2 | 8/2020 | Silvestro |
| 10,835,852 B2 | 11/2020 | Decoster et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0218150 A1 | 11/2003 | Blakemore et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0024061 A1 | 2/2005 | Cox et al. |
| 2005/0166561 A1 | 8/2005 | Schrage et al. |
| 2005/0173325 A1 | 8/2005 | Klein et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0180537 A1 | 8/2006 | Loftis et al. |
| 2006/0213139 A1 | 9/2006 | Stramandinoli |
| 2007/0175815 A1 | 8/2007 | Thomas |
| 2007/0240392 A1 | 10/2007 | Ng et al. |
| 2007/0261374 A1 | 11/2007 | Nelson et al. |
| 2008/0011672 A1 | 1/2008 | Schwartz et al. |
| 2008/0022641 A1 | 1/2008 | Engelland et al. |
| 2008/0087589 A1 | 4/2008 | Grzonka et al. |
| 2008/0107765 A1 | 5/2008 | Considine et al. |
| 2008/0110142 A1 | 5/2008 | Nelson et al. |
| 2008/0250766 A1 | 10/2008 | Schrage et al. |
| 2008/0307759 A1 | 12/2008 | Reichter et al. |
| 2009/0057213 A1 | 3/2009 | Schiavon et al. |
| 2009/0064646 A1 | 3/2009 | Reichter et al. |
| 2009/0090669 A1 | 4/2009 | Holzmann et al. |
| 2009/0126324 A1 | 5/2009 | Smith et al. |
| 2009/0151311 A1 | 6/2009 | Reichter et al. |
| 2009/0193972 A1 | 8/2009 | Schwandt et al. |
| 2010/0043366 A1 | 2/2010 | Boehrs et al. |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0170209 A1 | 7/2010 | Nelson et al. |
| 2010/0186353 A1 | 7/2010 | Ackermann et al. |
| 2010/0258493 A1* | 10/2010 | Kindkeppel ............ B01D 29/01 210/235 |
| 2010/0263339 A1 | 10/2010 | Steins et al. |
| 2011/0197556 A1 | 8/2011 | Brown et al. |
| 2012/0055127 A1 | 3/2012 | Holzmann et al. |
| 2012/0061307 A1 | 3/2012 | Kindkeppel et al. |
| 2012/0223008 A1 | 9/2012 | Mbadinga-Mouanda et al. |
| 2014/0034565 A1 | 2/2014 | Loken et al. |
| 2014/0096493 A1 | 4/2014 | Kelmartin et al. |
| 2014/0151275 A1 | 6/2014 | Bradford et al. |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1 | 10/2014 | Rieger et al. |
| 2015/0013289 A1 | 1/2015 | Hasenfratz et al. |
| 2015/0013293 A1 | 1/2015 | Wagner et al. |
| 2015/0033684 A1* | 2/2015 | Pettersson ............ F02M 35/042 55/410 |

(56) References Cited

U.S. PATENT DOCUMENTS

| | | |
|---|---|---|
| 2015/0061307 A1 | 3/2015 | Nakanishi |
| 2015/0096273 A1 | 4/2015 | Kaiser |
| 2015/0176544 A1 | 6/2015 | Kaufmann et al. |
| 2016/0045848 A1 | 2/2016 | Campbell et al. |
| 2016/0059172 A1 | 3/2016 | Allott et al. |
| 2017/0078852 A1 | 3/2017 | Tan et al. |
| 2018/0318745 A1* | 11/2018 | Nichols .............. B01D 46/2414 |
| 2020/0324237 A1 | 10/2020 | Moers et al. |

FOREIGN PATENT DOCUMENTS

| | | |
|---|---|---|
| CN | 1486213 | 3/2004 |
| CN | 1590746 | 3/2005 |
| CN | 1754612 | 4/2006 |
| CN | 101084050 | 12/2007 |
| CN | 101374582 | 2/2009 |
| CN | 201292900 | 8/2009 |
| CN | 101695616 A | 4/2010 |
| CN | 102271780 A | 12/2011 |
| CN | 202746046 U | 2/2013 |
| CN | 103977647 | 8/2014 |
| CN | 104220142 A | 12/2014 |
| DE | 88 08 632 | 9/1988 |
| DE | 29613098 | 9/1996 |
| DE | 10 2008 062 956 | 12/2008 |
| DE | 10 2008 062 956 | 6/2010 |
| EP | 0 747 579 | 12/1996 |
| EP | 0 982 062 | 3/2000 |
| EP | 1 129 760 | 9/2001 |
| EP | 1 166 843 | 1/2002 |
| EP | 1 208 902 | 5/2002 |
| EP | 1 233 173 | 8/2002 |
| EP | 1 747 053 | 1/2007 |
| EP | 3 370 849 | 9/2018 |
| FR | 2214505 | 8/1974 |
| GB | 0 970 826 | 9/1964 |
| GB | 2 082 932 | 3/1982 |
| GB | 2 404 348 | 2/2005 |
| JP | 60-112320 | 6/1985 |
| JP | 01-163408 | 6/1989 |
| JP | 01-171615 | 7/1989 |
| JP | 02-025009 | 1/2002 |
| WO | WO-00/50152 | 8/2000 |
| WO | WO-00/74818 A1 | 12/2000 |
| WO | WO 2004/054684 | 7/2004 |
| WO | WO-2005/058461 | 6/2005 |
| WO | WO-2005/077487 | 8/2005 |
| WO | WO-2007/009039 | 1/2007 |
| WO | WO 2007/089662 | 8/2007 |
| WO | WO-2017/079191 A1 | 5/2017 |

OTHER PUBLICATIONS

International Search Report and Written Opinion issued for PCT/US2017/030386, dated Jul. 26, 2017, 9 pages.
First Office Action issued for German Patent Application No. 11 2010 001 567.8, including English language translation, dated May 18, 2017, 12 pages.
First Office Action issued for Chinese Patent Applicaton No. CN 2016800710703 dated Nov. 26, 2020, with translation, 19 pages.
International Search Report and Written Opinion for PCT/US2017/021615, dated Jun. 6, 2017, 8 pages.
International Search Report and Written Opinion issued for PCT/US2016/063053, dated Feb. 16, 2017, 8 pages.
Akro-Mils, "Nest & Stack Totes," retrieved from http://web.archive.org/web/20150323114331/https://akro-mils.com/produts/types/plastic-storage-containers/nest-stack-totes, 1 page (2015).
Final Office Action on U.S. Appl. No. 16/097,773 dated Dec. 14, 2020.
Non-Final Office Action on U.S. Appl. No. 16/083,945 dated Nov. 10, 2020.
Non-Final Office Action from U.S. Appl. No. 16/097,773, dated Jul. 14, 2020.
First Office Action issued for Chinese Patent Application No. CN201880018033.5 dated Dec. 24, 2020, 10 pages.

\* cited by examiner

FILTER WITH VARIABLE CROSS-SECTION AXIAL SEAL

CROSS-REFERENCE TO RELATED APPLICATIONS

This application is related to and claims priority to U.S. Provisional Patent Application No. 62/266,219, entitled "FILTER WITH VARIABLE CROSS-SECTION AXIAL SEAL," by Tofsland, filed on Dec. 11, 2015, the contents of which are herein incorporated by reference in their entirety and for all purposes.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, intake air is typically passed through a filter element to remove contaminants (e.g., particulates, dust, water, etc.) from the intake air prior to delivery to the engine. The filter elements require periodic replacement, as the filter media of the filter elements captures and removes the contaminants from the fluids passing through the filter media. In some cases, unauthorized or non-genuine replacement filter elements may be installed in the filtration systems during servicing operations. The unauthorized and non-genuine replacement filter elements may be of inferior quality to genuine, authorized filter elements. Thus, the use of unauthorized or non-genuine replacement filter elements may cause damage to the engine by allowing contaminants past the filter element.

To prevent the use of unauthorized filter elements, some filtration systems include variations in the filter element seal member, such as key elements and surface disruptors, that permit only authorized replacement filter cartridges to be installed in the filtration systems. However, these surface disruptors and key elements create complex sealing surfaces that can have weak seals because the surface disruptors do not allow the compression of the entire seal along the length of the seal member. The weak seals may allow for bypass of the filter element by the fluid (e.g., air) being filtered.

SUMMARY

Various example embodiments relate to filtration systems having an air filter with a variable cross-section axial seal member. One such filtration system includes a housing defining a central compartment therein. The housing includes an outlet and a housing sealing surface. The housing sealing surface is non-planar. The filtration system includes a cover removably coupled to the housing. The cover includes an inlet and a cover sealing surface. The filtration system further includes a filter element positioned within the central compartment of the housing. The filter element includes filter media and a seal member coupled to the filter media and circumscribing at least a portion of the filter media. The seal member has a first sealing surface and a second sealing surface. The seal member has a variable cross-section such that a distance between the first sealing surface and the second sealing surface varies along at least a portion of the seal member. The variable cross-section is complementary to the housing sealing surface and the cover sealing surface such that the seal member forms an axial seal between the housing and the cover when the filter element is installed in the air filtration system.

Another example embodiment relates to a filter element. The filter element includes filter media and a seal member coupled to the filter media and circumscribing at least a portion of the filter media. The seal member comprises a first sealing surface and a second sealing surface. The seal member has a variable cross-section such that a distance between the first sealing surface and the second sealing surface varies along at least a portion of the seal member.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, filtration systems having filter elements having an axial seal member with a variable cross-section are described. The variable cross-section is matched by the non-planar sealing surfaces of the housing and housing cover that receive the filter elements. The non-planar sealing surfaces of the housing and the housing cover prevent proper filtration system function when an unauthorized replacement filter element having a flat axial seal member is installed in the housing.

Figure 1:
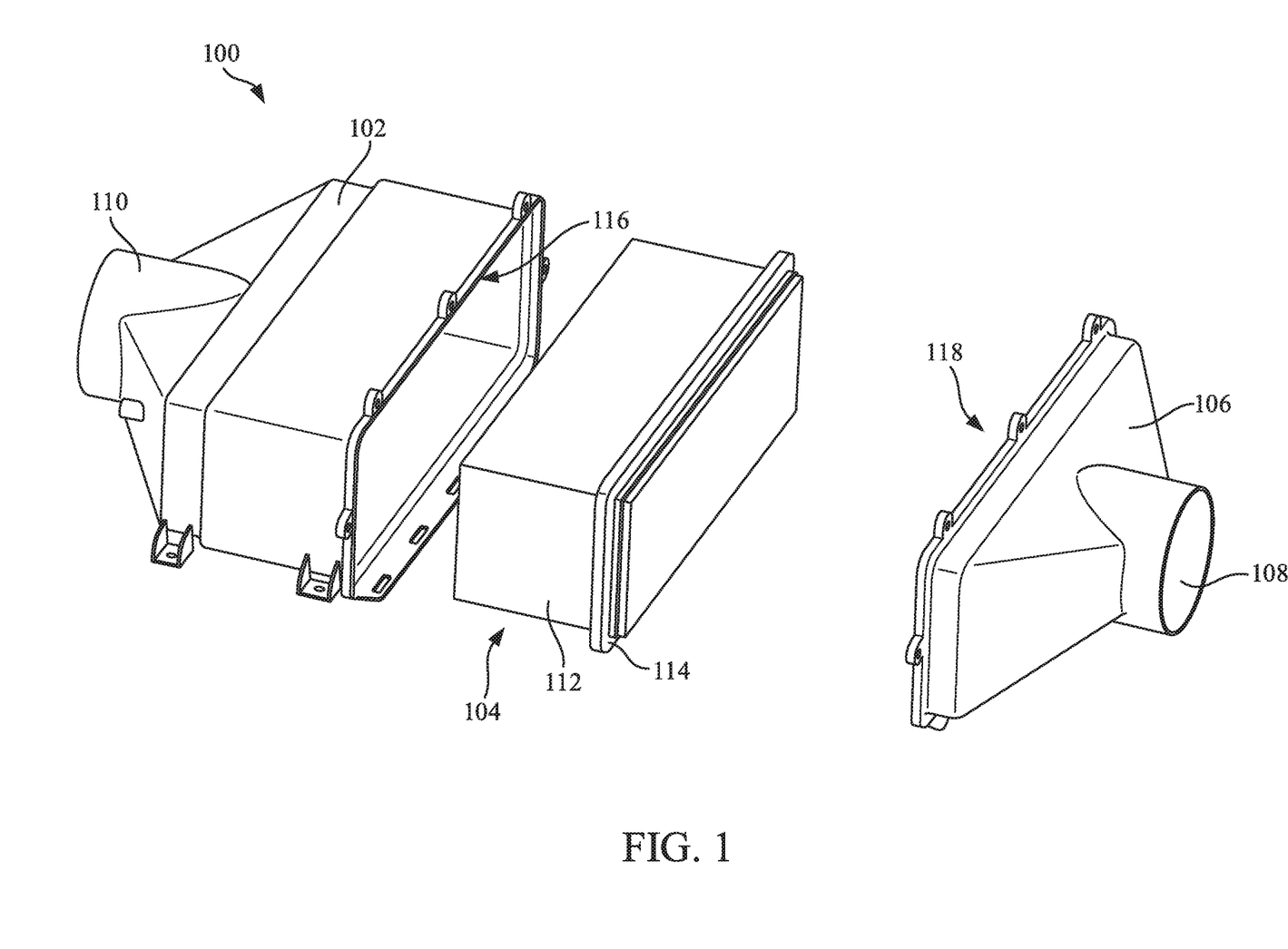
FIG. 1 shows an exploded view of a filtration system according to an example embodiment.
Figure 2:
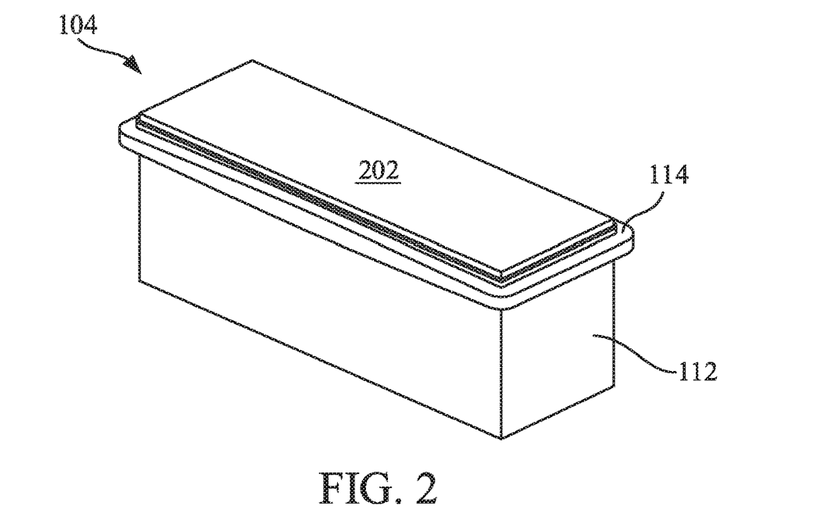
FIG. 2 shows a perspective view of the filter element of the filtration system of FIG. 1.

Referring to FIG. 1, an exploded view of a filtration system 100 is shown according to an example embodiment. In some arrangements, the filtration system 100 is an air filtration system. The filtration system 100 includes a housing 102, a filter element 104, and a cover 106. The cover 106 includes an inlet 108. The housing 102 includes an outlet 110. The filter element 104 includes filter media 112 and a seal member 114. The filter media 112 may include any of pleated media, corrugated media, tetrahedral media, or variations thereof. U.S. Pat. No. 8,397,920, entitled "PLEATED FILTER ELEMENT WITH TAPERING BEND LINES," by Moy et al., filed on Oct. 14, 2011, and issued on Mar. 19, 2013, assigned to Cummins Filtration IP Inc., which is incorporated by reference in its entirety and for all purposes, describes a tetrahedral filter media. Some configurations of tetrahedral filter media include a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920.

Although the filter media 112 is shown in FIG. 1 as a rectangular block having a rectangular cross-sectional shape, the filter media 112 can be arranged in other shapes. For example, the filter media 112 can be arranged as a cylindrical filter block having a circular cross-sectional shape, as a wound filter block (e.g., as described below with respect to FIGS. 9 and 10), as an oval filter block having an oval cross-sectional shape, as a panel, as a race-track shape, or the like.

When the filtration system 100 is in the assembled state, the filter element 104 is positioned within a central compartment of the housing 102. The seal member 114 contacts the housing sealing surface 116. The cover 106 is removably coupled to the housing (e.g., by fasteners). As the cover 106 is secured to the housing, the cover sealing surface 118 contacts the seal member 114 and compresses the seal member 114 between the housing 102 and the cover 106 to form an axial seal. The arrangement of the seal member 114 is described in further detail below with respect to FIGS. 2 through 7C.

Generally, when the filtration system 100 is assembled, the filtration system 100 filters air and provides the filtered air to a device, such as an internal combustion engine. The filtration system 100 receives air to be filtered through the inlet 108. The air passes from the inlet 108, into the cover 106, and through the filter media 112 of the filter element 104. As the air passes through the filter media 112, the filter media 112 removes contaminants (e.g., dirt, dust, moisture, etc.) contained in the air. The filtered air then passes through the housing 102 and out the outlet 110. As the filter element 104 filters the air, the filter media 112 captures the contaminants. Accordingly, the filter element 104 requires periodic replacement as the filter media 114 reaches capacity.

Figure 3:
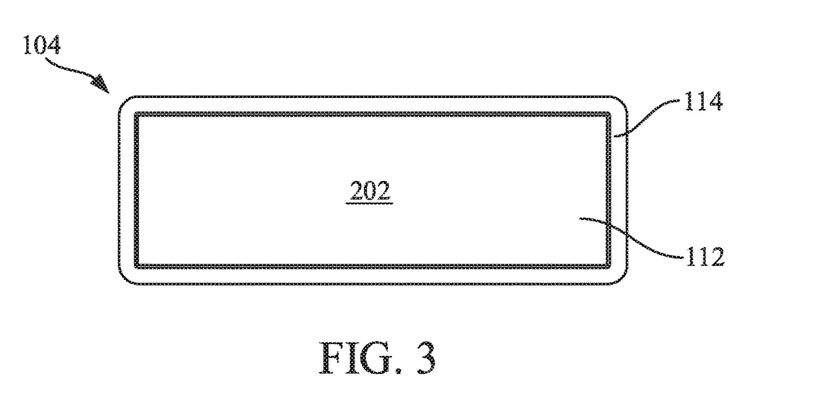
FIG. 3 shows a top view of the filter element of the filtration system of FIG. 1.

Referring to FIGS. 2 through 6, various views of the filter element 104 are shown. As shown best in the perspective view of the filter element 104 (FIG. 2) and the top view (FIG. 3), the filter media 112 is arranged as a filter block. The filter media 112 includes an inlet face 202 defining a dirty side of the filter element 114 and an outlet face 204 (opposite the inlet face; shown best in FIG. 5) defining a clean side of the filter element 104. The seal member 114 is coupled to and circumscribes at least a portion of an overall longitudinal length (i.e., a perimeter wall) of the filter media 112. The seal member 114 is positioned between the inlet face 202 and the outlet face 204. In some arrangements, the seal member 114 is adjacent to the inlet face 202. As shown in FIG. 3, in some arrangements the seal member 114 is substantially rectangular in shape when viewed from the top perspective. In such arrangements and similar arrangements, the seal member 114 includes two short sides and two long sides.

Figure 4:
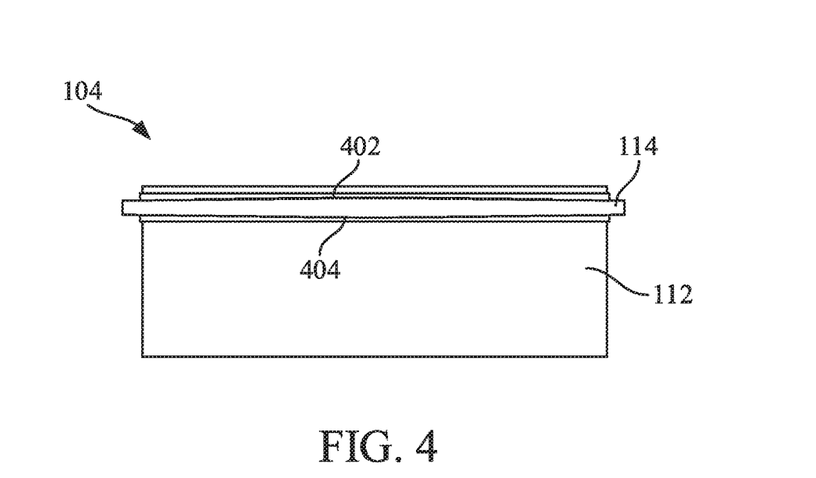
FIG. 4 shows a side view of the filter element of the filtration system of FIG. 1.
Figure 5:
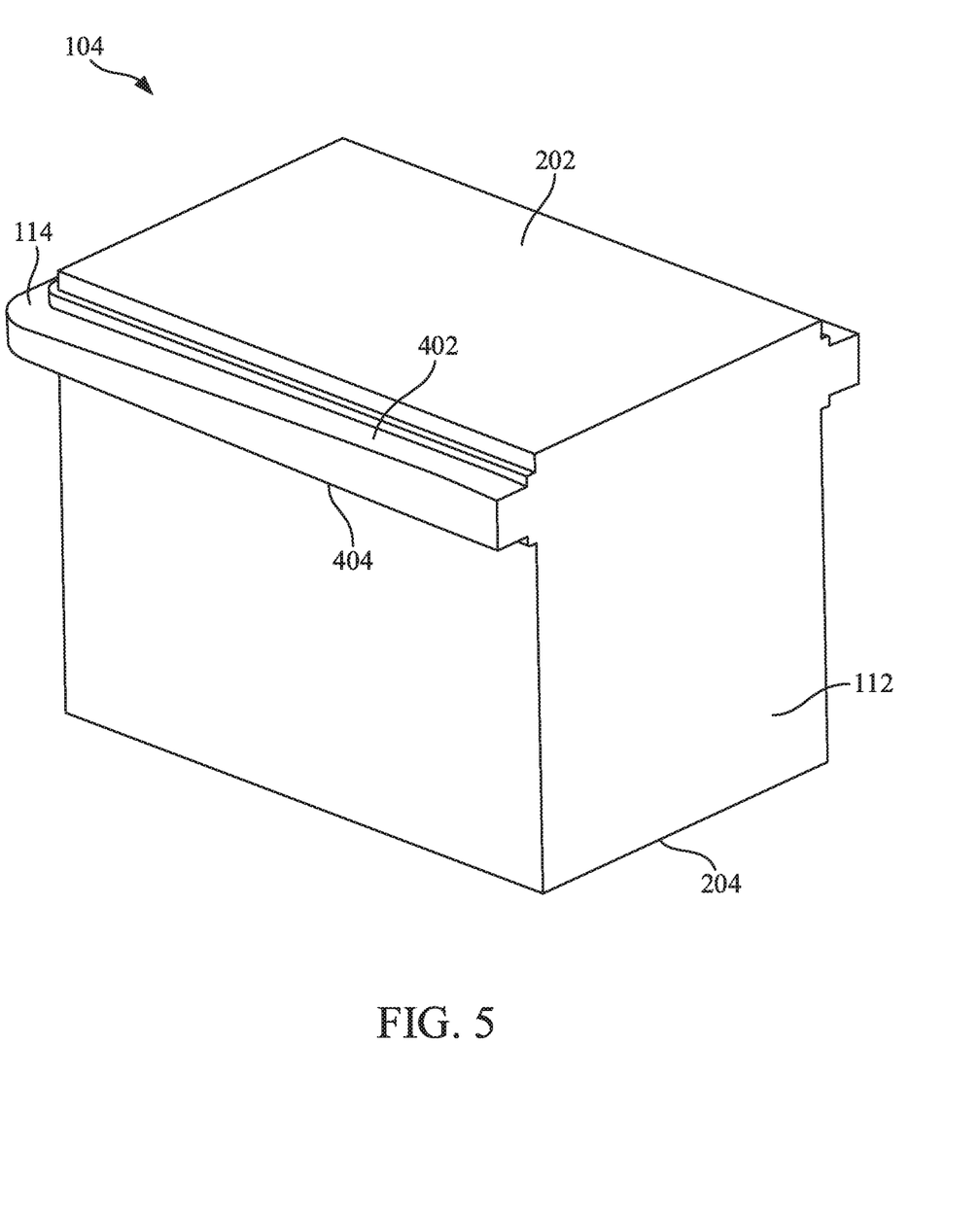
FIG. 5 shows a perspective cross-sectional view of the filter element of the filtration system of FIG. 1.
Figure 6:
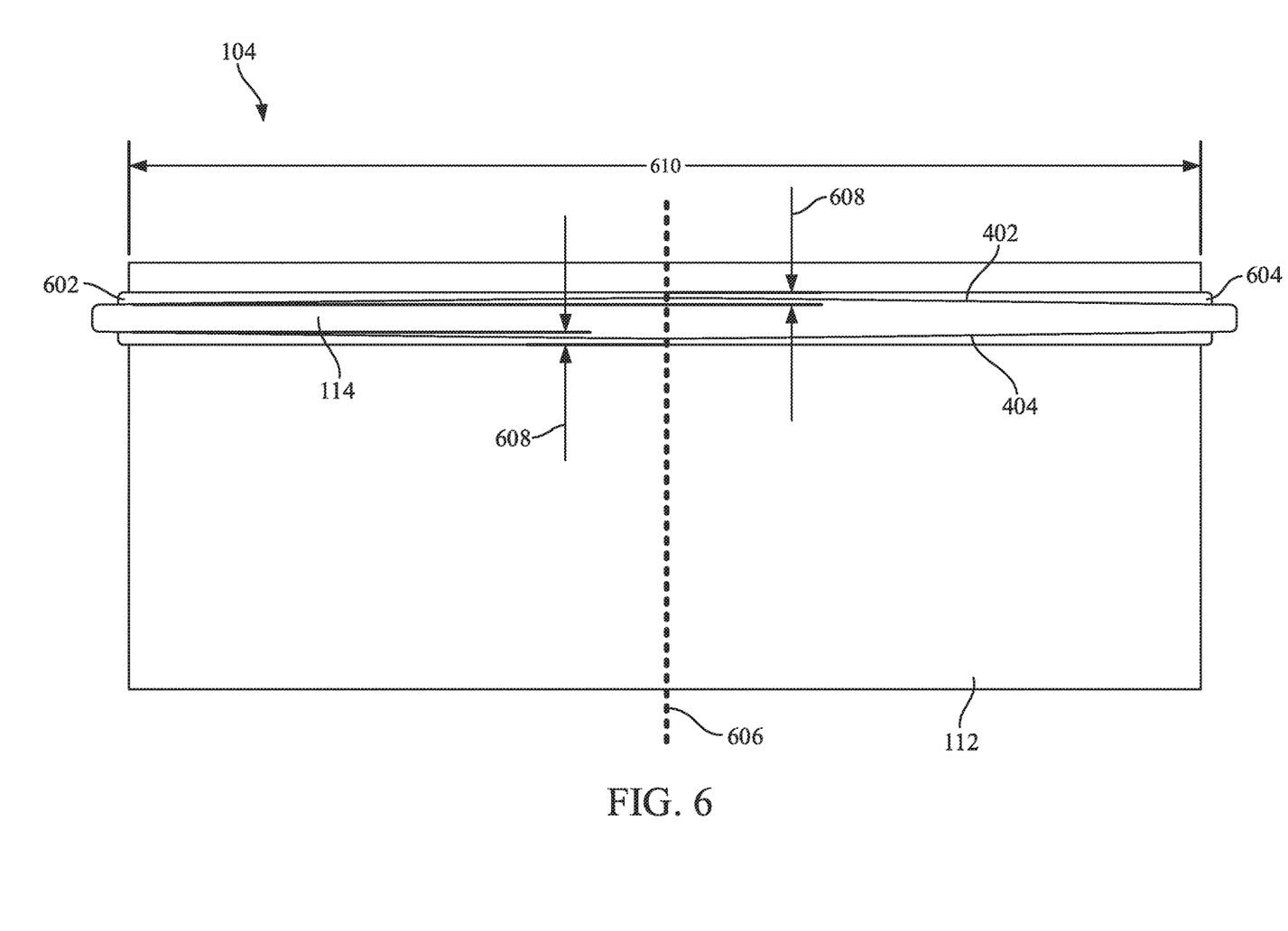
FIG. 6 shows another side view of the filter element of the filtration system of FIG. 1.

As shown best in FIGS. 4 through 6, the seal member 114 includes a first sealing surface 402 and a second sealing surface 404. The seal member 114 has a variable cross-section. Accordingly, the distance between the first sealing surface 402 and the second sealing surface 404 varies along at least a portion of the seal member 114. In arrangements where the seal member 114 is substantially rectangular in shape when viewed from the top perspective, the variable cross-section is caused by the arc-shape of the first and second sealing surfaces 402 and 404. In arrangements where the seal member 114 is substantially rectangular in shape, for example, the arc-shaped sealing surfaces 402 and 404 may be only along one of the four sides, only along the two long sides, only along the two short sides, or along one of the long sides and one of the short sides.

Referring to FIG. 6, the arc-shape of the first and second sealing surfaces 402 and 404 is shown in greater detail. The arc-shaped profile of the first and second sealing surfaces 402 and 404 extends from a first end 602 of the seal member to a second end 604 of the seal member. The arc-shaped profile comprises a continuous curve between the first end 602 and the second end 604. The continuous curve is a convex curve. In some arrangements, the continuous curve of the arc-shaped profile is symmetrical about a center axis 606 of the filter element 104. In such arrangements, the cross-section of the seal member 114 is greatest at the center axis 606 and smallest at the first end 602 and the second end 604. Each of the first and second sealing surfaces 402 is elevated at the center axis 606 by a height 608 with respect to the first and second ends 602 and 604. The height 608 is significantly smaller than a span distance 610 between the first end 602 and the second end 604. In some arrangements, the ratio of the span distance 610 to the height 608 is approximately 100:1. In further arrangements, the ratio of the span distance 610 to the height 608 is 102:1. In additional arrangements, the ratio of the span distance 610 to the height 608 is greater than 10:1. In still further arrangements, the ratio of the span distance 610 to the height 608 is greater than 50:1. The resulting arc formed by the continuous curve is a slight convex arc. The slight convex arc advantageously permits greater compression of the center of the seal member 114 (e.g., in the area of the central axis 606) to compensate for potential flex or warping of the housing sealing surface 116 of the housing 102 and the cover sealing surface 118 of the cover 106. Additionally, the relatively small amplitude maintains a majority of the sealing force in the axial direction thereby creating a strong axial seal.

Figure 7A:
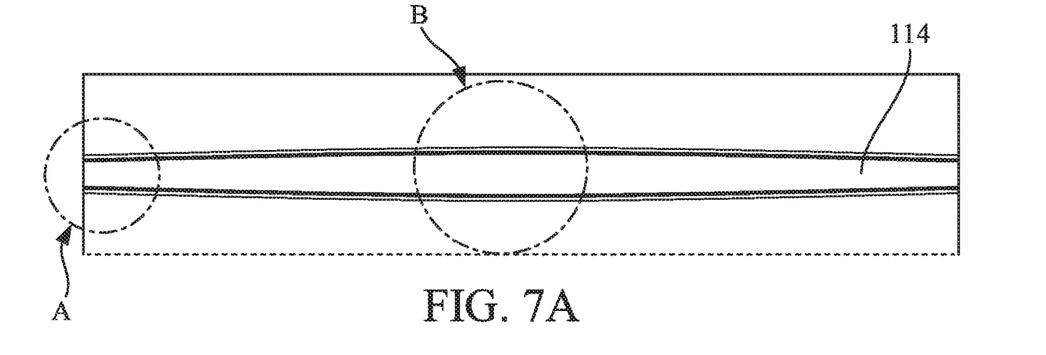
FIGS. 7A through 7C show views of the housing and cover of the filtration system of FIG. 1 forming a seal with the filter element of the filtration system of FIG. 1.
Figure 7B:
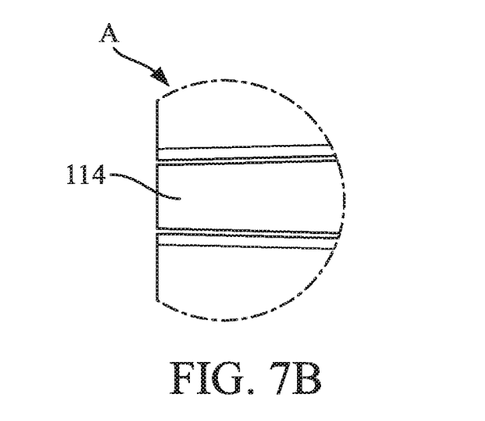
Figure 7C:
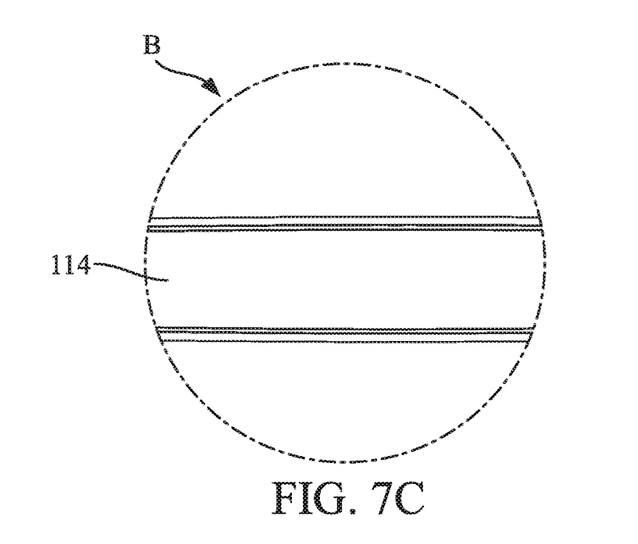

FIG. 7A shows a side view of the housing 102 and the cover 106 forming a seal with the seal member 114. FIG. 7B shows a close-up view of section A of FIG. 7A. FIG. 7C shows a close-up view of section B of FIG. 7A. As shown in FIGS. 7A through 7C, when the filter element 104 is placed in the housing 102 and secured in place with the cover 106, the housing sealing surface 116 and the cover sealing surface 118 form an axial seal with the seal member 114. The housing sealing surface 116 and the cover sealing surface 118 are non-planar and arced such that the housing sealing surface 116 and the cover sealing surface 118 are complementary with the variable cross-section of the seal member 114. The seal member 114 is compressed between the housing sealing surface 116 and the cover sealing surface 118. In some arrangements, the amount of compression at the center portion 702 of the seal member 114 (as emphasized in area B and shown in FIG. 7C) is 1.0 mm. In such arrangements, the amount of compression of at the first end 602 and the second end 604 may be less than 1.0 mm.

If an unauthorized replacement filter element having a flat axial seal member (e.g., an axial seal member that does not include the arc-shaped profile of the seal member 114), the housing 102 and the cover 106 will not form a proper seal against the flat axial seal member. As noted above, the housing sealing surface 116 and the cover sealing surface 118 are non-planar and arced such that the housing sealing surface 116 and the cover sealing surface 118 are complementary with the variable cross-section of the seal member 114. Since the housing sealing surface 116 of the housing 102 and the cover sealing surface 118 of the cover 106 are arced to form a proper seal with the seal member 114 (as discussed above with respect to FIGS. 7A through 7C), a first gap will exist between the housing sealing surface 116 and the flat axial seal member, and a second gap will exist between the cover sealing surface 118 and the flat axial seal member. The first and second gaps would provide bypass flow paths around the unauthorized replacement filter element thereby drastically reducing the efficiency of the filtration system 100.

Figure 8:
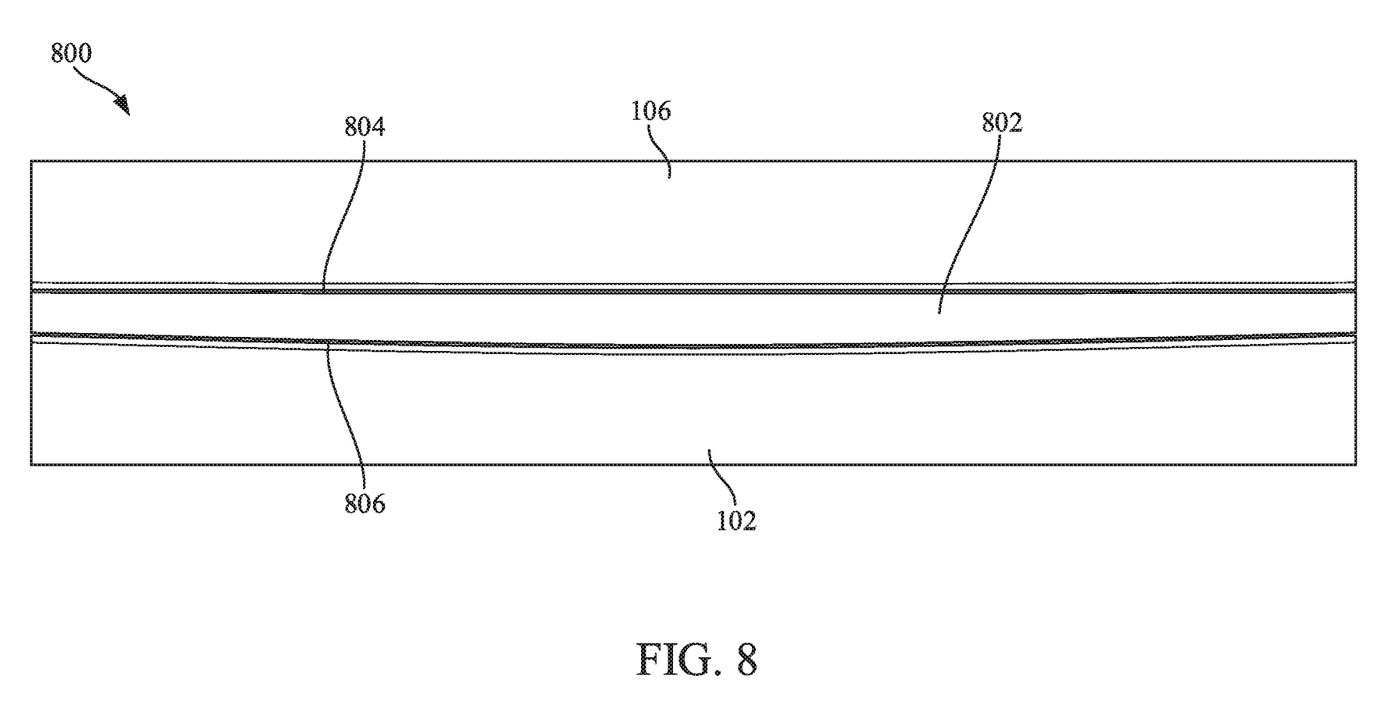
FIG. 8 shows a side view of a filtration system according to an example embodiment.

Referring to FIG. 8, a close-up side view of a filtration system 800 is shown according to an example embodiment. The filtration system 800 is substantially similar to the filtration system 100. Accordingly, like numbering is used to designate similar components. The primary difference between the filtration system 800 and the filtration system 100 is that the seal member 802 of the filtration system 800 has a different cross-section than the seal member 114 of the filtration system 100. The seal member 802 includes a first sealing surface 804 and a second sealing surface 806. Similar to the seal member 114, the seal member 802 has a variable cross-section. Accordingly, the distance between the first sealing surface 804 and the second sealing surface 806 varies along at least a portion of the seal member 802. Unlike the seal member 114, only one of the first sealing surface 804 and the second sealing surface 806 is non-planar and has an arc-shaped profile caused by a continuous convex curve between the first and second ends of the seal member 802 (e.g., as described above with respect to the arc-shaped profile of the seal member 114), while the other of the first sealing surface 804 and the second sealing surface 806 is flat or planar. As shown in FIG. 8, the first sealing surface 804 is flat, and the second sealing surface 806 is arced in a similar manner as described above with respect to either the first or second sealing surfaces 402 or 404 of the seal member 114. Accordingly, the cover sealing surface 118 of the cover 106 is flat to form a proper seal with the first sealing surface 804.

Figure 9:
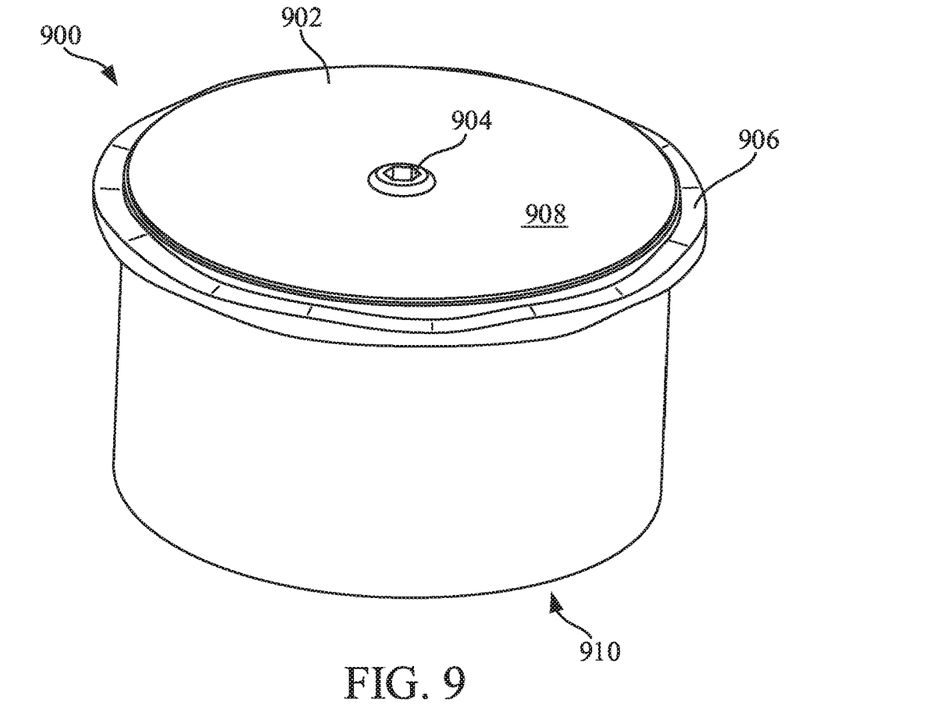
FIG. 9 shows a perspective view of a cylindrical filter element according to an example embodiment.
Figure 10:
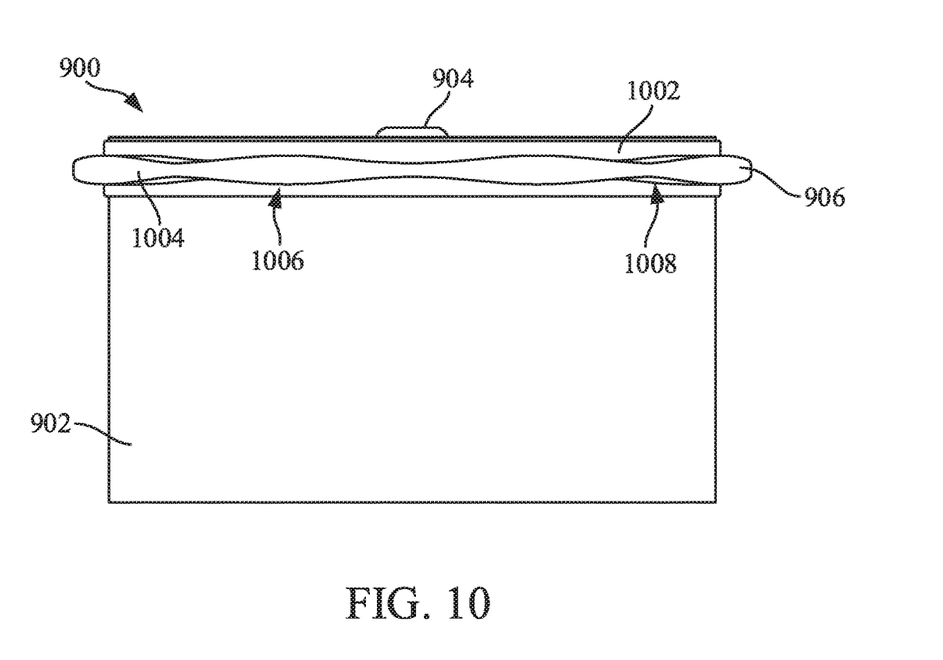
FIG. 10 shows a side view of the cylindrical filter element of FIG. 9.

Referring to FIGS. 9 and 10, views of a filter element 900 are shown according to an example embodiment. The filter element 900 is a cylindrical filter element having filter media 902 surrounding a central core 904. The filter media 902 may include any of pleated media, corrugated media, tetrahedral media, or variations thereof. In some arrangements, the filter media 902 is wound around the core 904. The filter element 900 includes a seal member 906. When the filter element 900 is positioned in a filtration system housing, the seal member 906 is compressed between the housing and a housing cover (e.g., in a similar manner as described above with respect to the filter element 104 of the filtration system 100). The filter media 902 includes an inlet face 908 and an outlet face 910. When the filter element 900 is installed within the housing and the filtration system is activated, air to be filtered passes through the filter media 902 from the inlet face 908 and out of the outlet face 910.

The seal member 906 is coupled to and circumscribes an axial wall of the filter media 902. The seal member 906 is positioned between the inlet face 908 and the outlet face 910. In some arrangements, the seal member 906 is adjacent to the inlet face 908. The seal member 906 is substantially ring-shaped when viewed from the top perspective. As shown best in FIG. 10, the seal member 906 includes a first sealing surface 1002 and a second sealing surface 1004. The seal member 906 does not have a uniform cross-section. Accordingly, the distance between the first sealing surface 1002 and the second sealing surface 1004 varies along at least a portion of the circumference of the seal member 906. Each of the first sealing surface 1002 and the second sealing surface 1004 are non-planar. Both the first sealing surface 1002 and the second sealing surface 1004 have a continuous wave profile (as shown in FIG. 10). In the arrangement of FIG. 10, the continuous wave profiles of the first sealing surface 1002 and the second sealing surface 1004 are aligned such that the seal member 906 has thick portions 1006 and thin portions 1008. In other arrangements, the continuous wave profiles of the first and second sealing surfaces 1002 and 1004 are offset such that the seal member 906 has a substantially uniform thickness around the circumference.

In some arrangements, the continuous wave profile is a sinusoidal wave pattern. The amplitude distance of the sinusoidal wave pattern is substantially smaller than the period distance (i.e., the distance between successive peaks in the sinusoidal wave pattern). In some arrangements, the ratio of the period distance to the amplitude distance is approximately 100:1. In further arrangements, the ratio of the period distance to the amplitude distance is 102:1. In additional arrangements, the ratio of the period distance to the amplitude distance is greater than 10:1. In still further arrangements, the ratio of the period distance to the amplitude distance is greater than 50:1. The sinusoidal wave pattern is a wave pattern having a relatively small amplitude. The relatively small amplitude advantageously permits greater compression of the of the seal member 906 at the peak portions 1006 to compensate for potential flex or warping of the housing sealing surface of the housing and the cover sealing surface of the cover. Additionally, the relatively small amplitude maintains a majority of the sealing force in the axial direction thereby creating a strong axial seal.

In order for the filter element 900 to form a proper seal with the housing and the housing cover, the sealing surfaces of the housing and the housing cover have a matching sinusoidal wave pattern. If an unauthorized replacement filter element having a flat axial seal member (e.g., an axial seal member that does not include the arc-shaped profile of the seal member 114), the housing and the cover will not form a proper seal against the flat axial seal member. Since the housing sealing surface of the housing and the cover sealing surface of the cover have waved sealing surfaces to form a proper axial seal with the seal member 906, gaps will exist between the housing sealing surface, the cover sealing surface, and the flat axial seal member. The gaps would provide bypass flow paths around the unauthorized replacement filter element thereby drastically reducing the efficiency of the filtration system.

Figure 11:
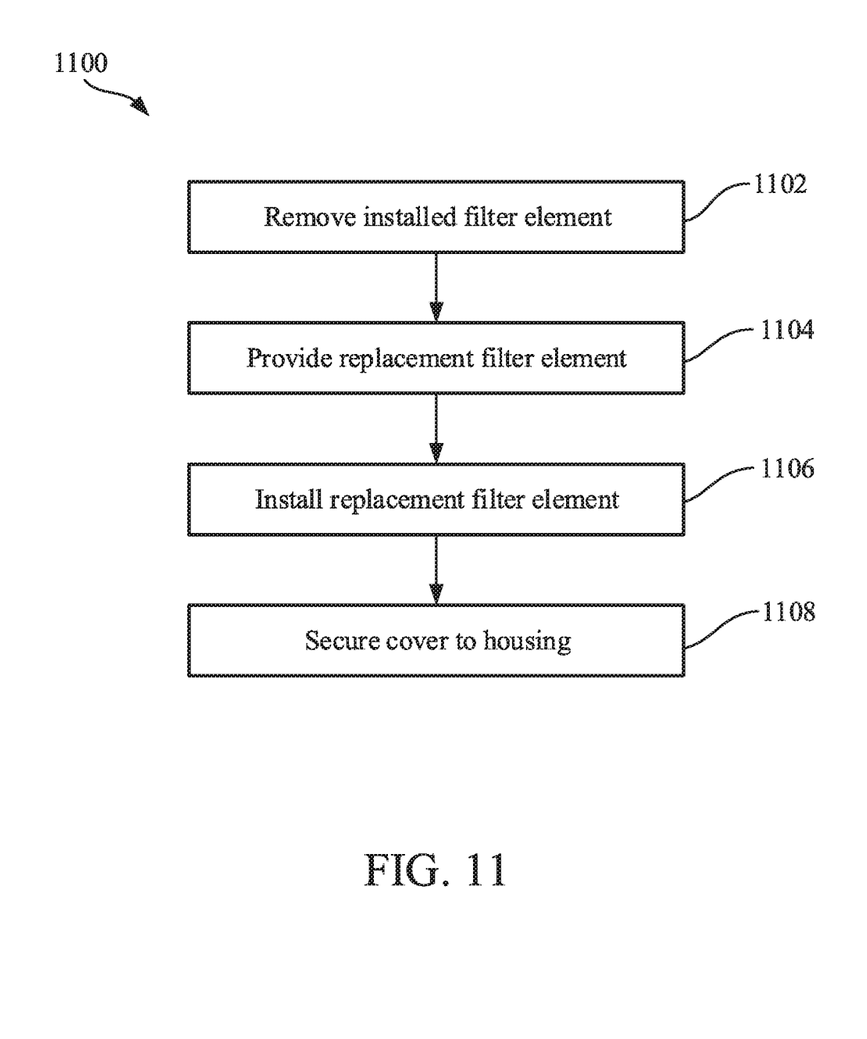
FIG. 11 shows a flow diagram of a method of replacing a filter element in a filtration system according to an example embodiment.

Referring to FIG. 11, a flow diagram of a method 1100 of replacing a filter element in a filtration system (e.g., filtration system 100) is shown according to an example embodiment. The method 1100 begins when a filter element is removed from the filtration system at 1102. The filter element is removed by a technician or another individual servicing the filtration system. To remove the filter cartridge, a filtration system cover (e.g., cover 106) is removed from the housing (e.g., housing 102) to provide access to the installed filter cartridge. After the filter cartridge is removed at 1102, a replacement filter cartridge (e.g., filter element 104) is provided at 1104. The filter element 104 includes filter media and an axial seal member (e.g., seal member 114) of the type discussed above. The axial seal member includes at least one sealing surface having an arc-shaped profile comprising a continuous curve between a first and second end of the seal member. The arc-shaped profile of the axial seal member substantially matches a mating arc-shaped profile in the cover and/or housing sealing surfaces.

The replacement filter element is installed at 1106. The replacement filter element is inserted into the housing. When the replacement filter element is inserted into the housing a first sealing surface of the axial seal member contacts a housing sealing surface. The replacement filter element may be of the type discussed above with regard to the filter media and the axial seal member. The cover is secured to the housing at 1108. When the cover is secured to the housing, a second sealing surface of the axial seal member contacts a cover sealing surface of the cover. The cover may be secured to the housing via a clamp, a fastener, a snap-fit connection, or the like. As the cover is secured to the housing, the seal member is compressed between the housing sealing surface and the cover sealing surface, forming an axial seal.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The term "approximately" when used with respect to values means plus or minus five percent of the associated value.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system, comprising:
   a housing defining a central compartment therein, the housing including an outlet and a housing sealing surface, the housing sealing surface being non-planar;
   a cover removably coupled to the housing, the cover including an inlet and a cover sealing surface; and
   a filter element positioned within the central compartment of the housing, the filter element including filter media and a seal member coupled to the filter media and circumscribing at least a portion of the filter media, the seal member including a first sealing surface and a second sealing surface, the first sealing surface has an arc-shaped profile extending from a first end of the seal member to a second end of the seal member, the second sealing surface has an opposite arc-shaped profile extending from the first end of the seal member to the second end of the seal member, each arc-shaped profile defines a convex arc shape comprising a continuous curve between the first end and the second end, the seal member having a variable cross-section such that, at a perimetral distance from the filter media, an axial distance between the first sealing surface and the second sealing surface varies along at least a portion of the seal member, the variable cross-section being complementary to the housing sealing surface and the cover sealing surface such that the seal member forms an axial seal between the housing and the cover when the filter element is installed in the air filtration system.

2. The system of claim 1, wherein each arc-shaped profile has a height that is smaller than a span distance such that a ratio of the span distance to the height is greater than 10 to 1.

3. The system of claim 2, wherein the ratio of the span distance to the height is greater than 50 to 1.

4. The system of claim 2, wherein the opposite arc-shaped profile extends the span distance and has the height that is smaller than the span distance.

5. The system of claim 4, wherein the cover sealing surface is non-planar.

6. The system of claim 1, wherein the filter element is a cylindrical filter element, and wherein the seal member is ring shaped.

7. The system of claim 1, wherein the seal member is substantially rectangular in shape.

8. The system of claim 1, and wherein the distance between the first sealing surface and the second sealing surface varies along only one of four sides of the seal member.

9. The system of claim 1, and wherein the distance between the first sealing surface and the second sealing surface varies along at least two of four sides of the seal member.

10. The system of claim 1, wherein the first sealing surface and the second sealing surface are on opposing sides of the seal member.

11. A filter element comprising:
    filter media; and
    a seal member coupled to the filter media and circumscribing at least a portion of the filter media, the seal member comprising a first sealing surface and a second sealing surface, the first sealing surface has an arc-shaped profile extending from a first end of the seal member to a second end of the seal member, the second sealing surface has an opposite arc-shaped profile extending from the first end of the seal member to the second end of the seal member, each arc-shaped profile defines a convex arc shape comprising a continuous curve between the first end and the second end, the seal member having a variable cross-section such that, at a perimetral distance from the filter media, an axial distance between the first sealing surface and the second sealing surface varies along at least a portion of the seal member.

12. The filter element of claim 11, wherein each arc-shaped profile has a height that is smaller than a span distance such that a ratio of the span distance to the height is greater than 10 to 1.

13. The filter element of claim 12, wherein the ratio of the span distance to the height is greater than 50 to 1.

14. The filter element of claim 12, wherein the opposite arc-shaped profile extends the span distance and has the height that is smaller than the span distance.

15. The filter element of claim 14, wherein the cover sealing surface is non-planar.

16. The filter element of claim 11, wherein the filter element is a cylindrical filter element, and wherein the seal member is ring shaped.

17. The filter element of claim 11, wherein the seal member is substantially rectangular in shape.

18. The filter element of claim 11, and wherein the distance between the first sealing surface and the second sealing surface varies along only one of four sides of the seal member.

19. The filter element of claim 11, and wherein the distance between the first sealing surface and the second sealing surface varies along at least two of four sides of the seal member.

20. The filter element of claim 11, wherein the first sealing surface and the second sealing surface are on opposing sides of the seal member.

* * * * *